United States Patent Office 3,567,459
Patented Mar. 2, 1971

3,567,459
SIMULATED BONE COMPRISING SUGAR SOLIDS IN A MOLTEN-THIXOTROPIC THERMOSETTING FORM
Philip J. Wruk, 111 Spoonwood Road, Wilton, Conn. 06897; Philip Roemer, Battle Creek, Mich. (17 Columbus Drive, Carmel, N.Y. 10512); and Peter Q. Van Middlesworth, Rte. 1, Climax, Mich. 49034
No Drawing. Filed July 12, 1967, Ser. No. 652,680
Int. Cl. A23j 1/12; A23k 1/00
U.S. Cl. 99—2
11 Claims

ABSTRACT OF THE DISCLOSURE

A simulated dog bone is formed from a molten thixotropic thermo-setting sugar composition that includes nutritional fillers, fatty flavoring materials and fat-absorbing farinaceous ingredients wherein the simulated dog bone composition upon cooling solidifies to a hard and non-brittle product.

---

The present invention relates to the process of manufacture of simulated bone, which product displays the attributes of bones which are fed to carnivorous animals.

Most carnivorous animals, typically dogs, display a desire for the bones of other animals. Their eating habits with respect to these bones have to be distinguished from their eating habits for other conventional animal foods such as meal-type and the like wherein the animal will gulp his food portions. In the case of bones, animals such as dogs gnaw and derive apparent satisfaction from the chewing exercise that accompanies bone fracture and further mastication. Most dog owners feel that in addition to the nourishment afforded the animal in the form of bone calcium and phosphorus, the animal enjoys a certain amount of pleasure or satisfaction from such bone consumption. Some bones which do not splinter, such as knuckle bones, do provide, in the opinion of many veterinarians, a chewing exercise which is thought to be beneficial. In addition, mastication of bones may provide teeth cleaning benefits stemming from the abrasion and other contacts of bone fragments as the bone is being subdivided incident to mastication.

With the advent of prepared packaged meats which are sometimes deboned, pet owners do not have the bone or bone fragment "waste" or "scraps" which they otherwise would have fed their animals. Prior art workers have suggested the possibility of simulating bones. Bone-shaped products containing significant levels of bone meal and those minerals and vitamins such as calcium, phosphorus, which might be said to provide to some degree the nutrition that is present in the consumption of natural bones, have been and continue to be marketed as treats. But such products are comparatively brittle and not as much like natural bones as may be desired.

The problems of simulating a bone is that it should be both convenient to the housewife and palatable and otherwise attractive to the dog and should, at the same time, offer the mastication exercise as well as nourishment which dogs and other carnivora derive from gnawing and otherwise consuming bones. Established palatability factors involved in formulating such a simulated bone product are actually nonexistent to some degree, personal opinions and availability are what dictate the selection of bones and the condition of the bone fed to the animal.

The present invention pertains to the manufacture of a simulated bone from a sugar heated to a hot melt which when allowed to cool will solidify into a hard mass. By the present invention a composition containing sugar is formulated wherein nutritional filler ingredients such as bone meal and/or meat meal is included together with other mineral and vitamin supplements and wherein flavors in the form of fats are desirably located throughout the sugar hot melt. Importantly the solidified composition of the present invention is hard and non-brittle in that it will not readily fracture and hence will offer to the animal the intended chewing exercise and other benefits stemming from normal mastication of natural bones. In addition the composition will, nevertheless, fracture upon being subjected to a certain degree of shear force such as when the animal gnaws and so will provide a chewing exercise like that experienced when chewing a natural bone.

The composition of the present invention is suited to the shaping thereof into a hollow or solid form having the exterior appearance resembling that of bones. Provision of such a hollow interior is difficult of accomplishment when it is attempted to also provide a product which has the aforementioned hard non-brittle and yet frangible character, allowing the composition to be subdivided into discrete particles. However, the invention is not to be restricted in its scope to the formulation of a composition having the preferred non-brittle texture but rather is entitled to a broader interpretation, as being addressed to a composition and process of converting same which will produce hardness in the final product as well as shape definition necessary to provide a simulated bone. Further, the composition of the present invention, when it is eventually shaped to the desired extent and allowed to cool, is substantially even in appearance and feel and is in a state which is substantially "clean" to the touch; it is relatively non-greasy and non-sticky despite the presence therein of a significant proportion of tallow or other fat.

The simulated bone product of the present invention may have included therein discrete color producing material such as meat and bone meal, as well as tallow; the meat and bone meal and the tallow provides a shaded darkened appearance which can be advantageously modified by the addition of coloring pigment such as titanium dioxide, which thereby provides an overall uniformly shaded caste to the composition reminiscent of natural bone or bone fragments. The objects of the invention therefore are many as will be understood from the preceding description of the composition per se and the ultimate bone shape converted therefrom and these objects will become more apparent to those skilled-in-the-art as the invention is described hereafter.

In accordance with the present invention, an amylaceous hydrolyzate containing mono-, di-, tri- and polysaccharides and mixtures thereof such as those derived from corn or like cereals or tubers is converted to a solidifiable "hot melt" condition wherein is distributed the nutritional filler materials desired for the simulated bone product, e.g., meat and/or bone meal vitamins and dicalcium phosphate. The term "hot melt" applies to the viscous semi-liquid candy-like state of sugar solids in molten thixotropic thermo-setting form. The hot melt is converted to a substantially molten condition by elevating the temperature thereof, say to 212° F. or above, and maintaining that temperature for a period of time such as causes a moisture reduction to provide a molten mass having a moisture content of less than 5% and preferably in the neighborhood of about 2%, which hot melt is continually agitated to minimize browning of the saccharidal constituents therein and thereby avoid an undesirably dark final product color. However, a "melt" having the desired working plasticity and ability to solidify may also be obtained by high vacuum thin-film heat transfer techniques employing lower melt film temperatures of 180° F.

The sugar melt has dispersed therein a proportion of farinaceous ingredients which have been previously blended with tallow and preferably lubricants such as propylene glycol and dispersion is continued until said dry ingredients are intimately and substantially uniformly blended throughout the hot melt, or vice versa, until the bone-forming composition assumes a soft, pliable dough-like appearance and texture. The dough-like product will contain, preferably as a minor weight constituent thereof, i.e., less than 50% but greater than 5% and more preferably 15–40% thereof, a mixture of starch and flour and provide the blend with a consistency such that when it is ultimately shaped and cooled the shaped form will cool to a relatively non-sticky form having an even feel.

Preferably the starch will be present in a sufficiently large percentage that it will be available to act as an absorbent for that level of tallow or other fat which is included in the other ingredients and will there reduce any tendency for the composition once shaped and cooled to exhibit a greasy feel. However, the level of such starch should be below that point at which it will induce a product to puff or expand incident to ultimate extrusion, since such puffing will detract from consistent shaping and provision of a desirably continuous densified bone-like appearance. But the invention is not to be restricted to the preferred unpuffed form since a puffed version of a bone shape may be similarly practiced in accordance with this invention.

The art whereby a melt having farinaceous constituents blended throughout for desirably absorbing the fat has a number of characterizing features which will now be described; these features are all important toward the objective of providing a preferred readily extrudable mass which when ultimately shaped and cooled will provide the aforedescribed bone-like attributes.

A preferred procedure for converting the aforesaid blend containing the intimate distribution of farinaceous filler materials throughout is to preliminarily convert this blend into a dry granular mix adapted to be subsequently worked and extruded to the desired hollow rope. This preferred procedure calls for continuing the mixing of the blend until the dough "break," that is, until the mass sub-divides into a granular powdered character; in this form the composition can be further cooled and stored, preferably at ambient room temperature conditions or below in an air conditioned atmosphere having a low relative humidity of say 40–55%. Such "breaking" is achieved typically by continuing to mix the dough typically at room temperature for, say a period of 10 minutes or until it cools to a temperature of approximately 140° F.; at this point it will sub-divide, mixing being continued for an additional and comparable period of time to allow the product to further cool to a temperature of 120° F. or below. The dry granular type "premix" thus produced can be stored for long periods of time with the foregoing precautions as to moisture pick-up and temperature being observed to prevent agglomeration and browning stemming from the presence of reducing compounds in the composition. Generally this premix will have a moisture content less than 6%.

The dry granular premix can thereafter be converted from this condition into a soft, pliable dough-like material by working the dry mix and subjecting it to elevated temperatures created by the frictional forces existing between proximately located metallic working elements in such vessels as an extruder, the working faces of which transfer the mix to an extrusion end and incident to which transfer heat is generated. Alternatively, the mix may be otherwise converted to the soft pliable dough-like consistency by agitation in any vessel wherein work input induces generation of elevated temperatures such that the crystalline material is caused to undergo a degree of softening due to liquefaction of the fatty constituents as well as the sugar constituents. It is important in this operation to maintain superatmospheric pressure on the mix while working is progressing so as to avoid premature phase separation, particularly of the liquefying fatty constituents, which could otherwise migrate to the surface and also to avoid charring which will occur at atmospheric pressures. After the dry granular mix has been transformed to the aforesaid soft pliable consistency, it is preferably cooled to below 230° F. prior to a second extrusion operation wherein the dough mass is shaped. Such intermediate cooling helps control product temperature so that the mass may be handled continuously and under controllable conditions. Cooling in this respect may be facilitated by sub-dividing the extrudate from the first extruder to wafer thin slices which will cool uniformly.

The invention is not to be restricted to cooling as such or for that matter to intermediate cooling at all, inasmuch as once soft pliable dough-like material is formed it can be desirably employed to convert this mass to the desired bone shape. It is preferred, however, for most applications, to effect such intermediate cooling in order to avoid a too highly elevated temperature in the actual shaping extrusion operation wherein too highly elevated temperatures can give rise to a gummy extrudate which does not display the desired shape-retention that is experienced with only moderately elevated temperatures. Similarly, such a prepared moderately cooled dough-like mass will not thereby become heated to those excessively high temperatures where browning or excessive extrudate-sticking will be experienced; rather a more moderately heated extrudate is producible which lends itself to shaping manipulations as will be described hereinafter.

In the preferred operation, therefore, the dough is worked in a second extruder which provides a uniform texture and then is extruded at a temperature between 170° and 210° F. whereby a hollow extrudate may be desirably formed which will retain its shape without collapsing incident to subdivision and like manipulations for providing the appearance of knuckles and other distinguishing bone shapes.

On the other hand, in other applications where a solid shape is provided there is less necessity for having an extrudate in a form which will not collapse incident to cooling, subdivision, or further manipulation incident to shaping or other handling. Thus the second extruder might be eliminated and the final product produced simply by subjecting the granular mix of a temperature of 170° to 230° F. under suitable super-atmospheric pressure with agitation until a mass of extrudable consistency is obtained.

In all of the foregoing extrusion operations it will be necessary to limit the upper temperature of the extrudate so that extensive browning does not occur and a practical upper limit of extrusion temperature will be 250° F.

Thus, the hot shapeable thermoplastic mass can be converted to the desired bone-like appearance, as indicated previously, by any one of a number of shaping techniques, the most preferred of which is the formation of a comparatively elongated hollow cylinder of substantial wall thickness, the thermoplastic nature of the composition being such that it will not collapse after extrusion and will be readily subdivided and thence knurled, pinched or otherwise handled in order to give the appearance of knuckles or other limb extremities typical of animal bones. To assure this appearance, it will be preferable to include in the shapeable composition a lubricant additional to the tallow or other fat that may be employed for palatability reasons. For this reason a polyol such as propylene glycol or glycerol may be included so as to minimize frictional drag between die faces and the composition as it is being finally shaped. In this way a smooth continuous and uninterrupted cylinder is produced. Although water may act as a lubricant to facilitate extrusion as in the case of the second extrusion embodiment mentioned hereinabove, the addition of water tends to detract from providing a smooth surface bone apparently due to the increased hydration of the farinaceous ingredient and possibly the localized liquefaction of the saccharides present. For this reason, it is generally preferred to employ a non-aqueous lubricant which can be readily incorporated into the ingredients preparatory to their being converted to a dry granular form, although it is within the ambit of the present invention that a lubricant can be added to any step in the process prior to final forming. Such a lubricant advantageously reduces any tendency for the shaped and cooled product to be sticky to the touch.

By reason of the consistency of the blend thus produced, particularly one that has been extruded in a hollow form, bones having a limb diameter in the order of ¾ of an inch have been produced having thin to thick walls, say, having ¼ of an inch thickness with an inner diameter in the neighborhood of ¼ of an inch. Change in the extruded form due to collapse of the extrudate is not great and extrudates of unlimited length can thus be created prior to sub-division, depending upon the bone that is to be simulated, commonly a length of the neighborhood of four inches may be obtained, the extremities of the cylindrical extrudate being thereafter pinched to merge diametrically opposed points on the cylinder whereafter the bone shape may be further defined as by radially displacing the extremities of the composition to provide a semi-round knuckled appearance.

In lieu of a hollow centered bone, however, a simulated "sawed" bone reminescent of a choice cut of meat may also be duplicated. Thus, within the spirit of this invention, a bone in the shape of, say a T-bone steak may be extruded and cut by a suitable cutting means; whereas the surface of such a bone in contact with the extruding die will be substantially uniform and smooth, a rough cut may be induced simulating a sawed transversed edge of such a T-bone meat cut.

Finally after the product has been formed, it will be preferably but not necessarily slowly cooled typically for a period in the neighborhood of about 30 minutes or until the product temperature has been reduced to below 120° F. or in any event below the temperature at which the fat will harden in the sugar matrix for the bone-like composition. Such slow cooling is to be practiced where it is desired that the sugars harden after surface fat in liquefiable condition has been absorbed by the product immediately after extrusion. Once such absorption has substantially taken place, a non-glossy surface due to the fat will be substantially absent from the surface of the bone and the product may be thereafter further cooled.

Although the invention has been described herein with reference to specific and preferred embodiments, it is not to be restricted in scope to such embodiments but rather is susceptible to a number of alternative embodiments. Thus, in the case of the creation of a "broken" dry premix, it is within the ambit of the present invention that other means may be employed to convert the saccharidal constituents to a substantially anhydrous condition having the nutritious and filling components thereof uniformly distributed throughout, whereupon the extrudate will be transferred to any shaping operation without the intermediate step of cooling and "breaking" to a granular condition. While elimination of an intermediate cooling step may be effected, as mentioned herein above, care should be observed to assure that extrusion temperature is generally in the range between 170° and 250° F. and preferably as indicated hereinabove, between 170° and 210° F. in order first to provide the uniformity of dough texture desired and secondly, in order to avoid an undue plasticity and softness which, in the case of a hollow extrudate, can give rise to collapse and general loss of bone shape.

Although a bone composed principally of sugar having as its main nutritious constituent bone meal and meat meal distributed throughout is within the ambit of the present invention, it is likewise practical to eliminate one or the other of such constituents or both and generally to provide a treat or similar masticatable consumable product. However, the benefits of the present invention will be best realized when a mineral- and vitamin-fortified product as indicated above is practiced, in which instance, particularly when dark colored meals are employed, it will be found generally desirable to include a whitening pigment such as titanium oxide which will lighten the shade of the extrudable dough mass and help in modulating final product color that would otherwise be attributed to the darkening effect of the meat meal. The saccharidal constituent, forming the principal weight material in the shapeable composition, will be preferably one derived from corn and will commonly constitute a mixture of dextrins and glucose as well as other reducing sugars in varying ratios but the invention is not to be restricted to any particular form of sugar but rather being understood to be applicable to any amylaceous material hydrolyzed and saccharified by acid, enzyme, or both acid and enzyme.

What is claimed is:

1. Process for manufacturing of a simulated bone which comprises preparing a hot melt of sugar having a moisture content less than 5% which hot melt of sugar is a viscous semi-liquid candy-like state of sugar solids in molten-thixotropic thermo-setting form, and converting said melt to a dough-like bone-forming composition including nutritional fillers and fatty flavoring materials; incorporating a level of fat-absorbing farinaceous ingredients throughout the dough at an elevated temperature and for a time period sufficient to promote absorption of said fatty flavoring material by said farinaceous material; causing the composition to be shaped to a bone-form at a temperature below that at which the constituents thereof will not be substantially discolored due to heating and whereat the form will substantially retain its shape until hardened upon subsequent cooling; and thereafter cooling the shaped form.

2. Process according to claim 1 wherein the farinaceous ingredients comprise a mixture of starch and flour and wherein said mixture is intimately and uniformly distributed throughout the sugar melt and converts said composition to a pliable dough wherein said mixture is present as a minor weight constituent.

3. Process according to claim 2 wherein mixing of the dough-like composition is continued until the mass subdivides into discrete powderous granules, said granules are cooled and the granules are thereafter reworked under frictionally-induced heat to reform said dough-like composition preparatory to shaping.

4. Process of claim 3 wherein said reworking is caused to proceed under superatmospheric pressure.

5. Process according to claim 4 wherein the reworked composition is at a temperature below 250° F. prior to shaping.

6. Process according to claim 5 wherein the composition is reworked by extrusion between proximately located working elements; and the extrudate is subdivided, cooled and thence re-extruded to the form desired.

7. Process according to claim 2 wherein the composition to be shaped is at a temperature less than 250° F.

8. Process according to claim 7 wherein the composition is extruded to a shape-retaining hollow form and then is subdivided and the extruded extremities are converted to a bone form.

9. Process according to claim 8 wherein the composition is at a temperature of 170°–230° F. just prior to extrusion.

10. Process according to claim 1 wherein the composition prior to shaping has a non-aqueous lubricant incorporated therein.

11. Process according to claim 1 wherein a titanium dioxide is included in the dough-like composition at a level sufficient to reduce darkening thereof.

References Cited

UNITED STATES PATENTS

| | | | |
|---|---|---|---|
| 3,149,039 | 9/1964 | Jeffries | 99—148 |
| 3,230,902 | 1/1966 | Grimm et al. | 99—2 |
| 982,711 | 1/1911 | Ellis | 99—2 |
| 1,695,567 | 12/1928 | Weber | 99—2 |

FOREIGN PATENTS

| | | | |
|---|---|---|---|
| 8,932 | 9/1909 | Great Britain | 99—2 |
| 975,333 | 11/1964 | Great Britain | 99—2 |

NORMAN YUDKOFF, Primary Examiner

C. P. RIBANDO, Assistant Examiner

U.S. Cl. X.R.

99—83

UNITED STATES PATENT OFFICE
CERTIFICATE OF CORRECTION

Patent No. 3,567,459          Dated March 2, 1971

Inventor(s) Philip J. Wruk, Philip Roemer and Peter Q. Van Middlesworth

It is certified that error appears in the above-identified patent and that said Letters Patent are hereby corrected as shown below:

Column 1, in the heading, the name of the assignee, its address and state of incorporation should appear as follows:

-- , assignors to General Foods Corporation, White Plains, N. Y., a corporation of Delaware --

Signed and sealed this 15th day of June 1971.

(SEAL)
Attest:

EDWARD M. FLETCHER, JR.
Attesting Officer

WILLIAM E. SCHUYLER, JR
Commissioner of Patents